(12) United States Patent
Uytterhoeven et al.

(10) Patent No.: US 11,971,740 B2
(45) Date of Patent: Apr. 30, 2024

(54) TIMING ERROR DETECTION AND CORRECTION CIRCUIT

(71) Applicant: NXP B.V., Eindhoven (NL)

(72) Inventors: Roel Lieve P Uytterhoeven, Heverlee (BE); Wim Dehaene, Leuven (BE)

(73) Assignee: NXP B.V., Eindhoven (NL)

( * ) Notice: Subject to any disclaimer, the term of this patent is extended or adjusted under 35 U.S.C. 154(b) by 417 days.

(21) Appl. No.: 17/335,178

(22) Filed: Jun. 1, 2021

(65) Prior Publication Data
US 2021/0382518 A1 Dec. 9, 2021

(30) Foreign Application Priority Data
Jun. 8, 2020 (EP) .................................. 20178825

(51) Int. Cl.
*G06F 1/08* (2006.01)
*G06F 30/39* (2020.01)
(Continued)

(52) U.S. Cl.
CPC .............. *G06F 1/08* (2013.01); *G06F 30/392* (2020.01); *G06F 30/394* (2020.01); *H03K 3/037* (2013.01);
(Continued)

(58) Field of Classification Search
CPC ........ G06F 1/08; G06F 30/392; G06F 30/394; G06F 2117/04; H03K 3/037; H03K 19/20; H03K 19/21
See application file for complete search history.

(56) References Cited

U.S. PATENT DOCUMENTS 5,949,260 A    9/1999  Toda
6,864,715 B1   3/2005  Bauer et al.
(Continued)

FOREIGN PATENT DOCUMENTS

EP      3361637 A1    8/2018

OTHER PUBLICATIONS

Bowman, Keith A. et al; "Energy-Efficient and Metastability-Immune Timing-Error Detection and Recovery Circuits for Dynamic Variation Tollerance"; IEEE Int. Conf. on Integrated Circuit Design and Technology, Austin, TX, US; pp. 155-158 (Jun. 2008).
(Continued)

*Primary Examiner* — Justin R Knapp

(57) ABSTRACT

An integrated circuit and method of designing an integrated circuit including an error detection and correction circuit is described. The integrated circuit includes a data-path being arranged between an output of a first register and second register clocked by a system clock. The integrated circuit includes a timing error detection and correction circuit (EDAC) which has a clock unit configured to receive a reference clock and to provide a delayed reference clock. The EDAC includes a plurality of transition detectors coupled to a respective node on the data-path and an error detection circuit coupled to each transition detector. The error detection circuit flags an error if a transition occurs during a time period between a transition of the reference clock and a corresponding transition of the delayed reference clock. A timing correction circuit coupled to the error detection circuit outputs the system clock derived from the delayed reference clock.

20 Claims, 10 Drawing Sheets

(51) Int. Cl.

| | |
|---|---|
| *G06F 30/392* | (2020.01) |
| *G06F 30/394* | (2020.01) |
| *H03K 3/00* | (2006.01) |
| *H03K 3/037* | (2006.01) |
| *H03K 19/20* | (2006.01) |
| *G06F 117/04* | (2020.01) |
| *H03K 19/21* | (2006.01) |

(52) U.S. Cl.
CPC .......... *G06F 2117/04* (2020.01); *H03K 19/20* (2013.01); *H03K 19/21* (2013.01)

(56) References Cited

U.S. PATENT DOCUMENTS

| | | | |
|---|---|---|---|
| 7,409,631 | B2 | 8/2008 | Tschanz et al. |
| 7,622,961 | B2 | 11/2009 | Grochowski et al. |
| 8,222,943 | B2 | 11/2012 | Sood et al. |
| 8,471,612 | B1 | 6/2013 | Bull et al. |
| 8,615,687 | B2 * | 12/2013 | Sandhu ............... G06F 1/324 714/708 |
| 8,639,987 | B2 * | 1/2014 | Whatmough ......... G06F 1/3296 714/47.1 |
| 9,329,622 | B2 | 5/2016 | Fatemi et al. |
| 9,746,871 | B2 | 8/2017 | Gupta et al. |
| 9,746,877 | B2 * | 8/2017 | Zhou ................... H03K 3/0375 |
| 10,024,916 | B2 | 7/2018 | Bowman et al. |
| 10,534,396 | B2 * | 1/2020 | Fabrie ................. H04L 7/0054 |
| 11,380,835 | B2 * | 7/2022 | Schneider ............ H03K 19/195 |

OTHER PUBLICATIONS

Choudhury, Mihir R. et al; "TIMBER: Time Borrowing and Error Relaying for Online Timing Error Resilience"; IEEE Transaction on Computers, vol. 63, No. 2; pp. 497-509 (Feb. 2014).

Das, Shidhartha et al; "RazorII: In-Situ Error Detection and Correction for PVT and SER Tolerance"; IEEE J. of Solid-State Circuits, vol. 44, No. 1; pp. 32-48 (Jan. 2009).

Ernst, Dan et al; "Razor: Circuit-Level Correction Of Timing Errors For Low-Power Operation"; IEEE Micro, vol. 24, Issue 6; pp. 10-20 (Dec. 2004).

Franco, Piero et al; "On-Line Delay Testing of Digital Circuits"; Proc. Of VLSI Test Symposiu, Cherry Hill, NJ, US; pp. 167-173 (Apr. 1994).

Kehl, Ted; "Hardware Self-Tuning and Circuit Performance Monitoring"; Proc. Of ICCD, Cambridge, MA, US; pp. 188-192 (Oct. 1992).

Santo, Toshinori et al; "A Simple Flip-Flop Circuit for Typical-Case Designs for DFM"; Proc. Of ISQED, San Jose, CA, US; pp. 539-544 (Mar. 2007).

Tschanz, James et al; "Tunable Replica Circuits and Adaptive Voltage-Frequency Techniques for Dynamic Voltage, Temperature, and Aging Variation Tolerance"; Proc. Of Symposium on VLSI Circuits, Kyoto, JP; pp. 112-113 (Jun. 2009).

Uht, A.K.; "Going Beyond Worst-Case Specs with TEAtime"; Computer, vol. 37, Issue 3; pp. 51-56 (Mar. 2004).

\* cited by examiner

300

350

750

TIMING ERROR DETECTION AND CORRECTION CIRCUIT

CROSS-REFERENCE TO RELATED APPLICATIONS

This application claims the priority under 35 U.S.C. § 119 of European patent application no. 20178825.4, filed Jun. 8, 2020 the contents of which are incorporated by reference herein.

FIELD

This disclosure relates to a timing error detection and correction circuit for an integrated circuit and a method for designing an integrated circuit including a timing error detection and correction circuit.

BACKGROUND

Integrated circuits (IC) implementing digital designs are designed to run at specified frequencies over a range of power, voltage and processing technology conditions. To improve the robustness of such digital designs a timing error correction and detection scheme may be used.

An example of such a system uses so-called Razor flip-flops "D. Ernst et. al. "Razor: Circuit-Level Correction Of Timing Errors For Low-Power Operation," IEEE Micro, Volume 24, Issue 6, December 2004, pp. 10-20." Razor flip-flops use dynamic detection and correction of speed path failures in digital designs. The Razor flip-flop accounts for process variations so it removes the need for unused margining. The flip-flops are augmented with an extra shadow latch which uses a delayed clock. If there is a timing violation in the main flip-flop, the shadow flip-flop will contain a different value after the clock edge of the delayed clock which can be used to flag the error and/or potentially to correct the error. Such a concept is referred to as double sampling. Razor has meta-stability problems in the data paths if there are setup or hold violations. Razor flip-flops also have relatively short delay paths and do not distinguish between late arrival of data and fast arrival of correct data. Consequently, Razor flip-flops require extra hold padding using additional buffers to ensure that only late arrivals are detected.

Another timing error detection and correction system is described in "Energy-Efficient and Metastability-Immune Timing-Error Detection and Recovery Circuits for Dynamic Variation Tolerance," IEEE Int. Conference on Integrated Circuit Design and Technology, Austin, TX, USA, June 2008, pp. 155-158. The circuits are able to detect timing errors similarly to Razor but they reduce area/energy overhead using a pulse latch and a transition detector.

SUMMARY

Aspects of the disclosure are defined in the accompanying claims. In a first aspect there is provided a timing error detection and correction circuit for an integrated circuit comprising a data-path, the data-path comprising at least one logic gate and arranged between an output of a first flop-flop and an input of a second flip-flop, the timing error detection and correction circuit comprising: a clock unit configured to receive a reference clock and to provide a delayed reference clock; a transition detector coupled to a node on the data-path and configured to detect a data value transition on the node; an error detection circuit coupled to the transition detector and the clock unit and configured to detect an error in response to a data value transition being detected during a time period between a transition of the reference clock and a corresponding transition of the delayed reference clock; a timing correction circuit coupled to the error detection circuit and configured to output a system clock derived from the delayed reference clock and to provide the system clock to the first flip-flop and the second flip-flop and wherein the timing correction circuit is further configured to adapt the system clock in response to an error being detected.

In some embodiments, the circuit further comprises a further transition detector coupled to a further node on the data-path and configured to detect a signal transition on the further node; wherein the error detection circuit is coupled to the further transition detector and is further configured to detect an error in response to a signal transition being detected by at least one of the transition detector and the further transition detector during a time period between a transition of the reference clock and a corresponding transition of the delayed reference clock.

In some embodiments, the data-path is arranged between a first set of flip-flops comprising the first flip-flop node and a second set of flip-flops comprising the second flip-flop and wherein the node and the further node have a path delay to at least one of the second set of flip-flops of less than 20 percent of the reference clock period.

In some embodiments, the clock unit comprises a delay unit having an input coupled to a reference clock input and an output coupled to a delayed reference clock output; and a logic circuit element having a first input coupled to the reference clock input and a second input coupled to the delayed reference clock output and configured to generate a signal for enabling the error detection circuit when the reference clock and the delayed reference clock are different.

In some embodiments, the logic circuit element is configured to generate an enable signal when the reference clock is logic high and the delayed reference clock is logic low.

In some embodiments, the logic circuit element implements a logical AND of the inverse of the delayed reference clock and the reference clock.

In some embodiments, the error detection circuit comprises a dynamic logic circuit having an input coupled to the output of the transition detection circuit and an enable input coupled to the logic circuit element output.

In some embodiments, the dynamic logic circuit comprises a further input coupled to the output of the further transition detection circuit and wherein the dynamic logic circuit implements a logical OR of the transition detection circuit output and the further transition detection circuit output.

In some embodiments, the transition detector comprises a transition detector input coupled to an input of a delay unit and a first input of an EXOR gate; an output of the delay unit coupled to a second input of the EXOR gate; and an output of the EXOR gate coupled to the transition detector output.

In some embodiments, the timing correction circuit further comprises a clock gate circuit having an error detect input coupled to the output of the error detection circuit, a clock input coupled to the clock unit output and a system clock output wherein the clock gate circuit is configured to couple the system clock output to the clock input if no error is detected and to decouple the system clock output from the clock input if an error is detected.

In some embodiments, the timing correction circuit further comprises a clock stretching circuit having an error detect input coupled to the output of the error detection circuit, a clock input coupled to the clock unit output and a system clock output wherein the clock gate circuit is configured to couple the system clock output to the clock input if no error is detected and to couple the system clock output to a time-shifted clock input if an error is detected.

In some embodiments, the clock stretching circuit comprises: a clock phase generator having an input coupled to the clock input and a plurality of outputs and configured to generate multiple phase outputs of a clock received on the clock input; a clock switch circuit having a plurality of inputs, each input coupled to a respective output of the clock phase generator; and a clock switch controller having an input coupled to the error detection circuit output and a controller output coupled to a control input of the clock switch circuit; and wherein the clock switch controller is configured to control the clock switch circuit to couple one of the outputs to the system clock output dependent on the signal received on the error detection input.

In some embodiments, the clock stretching circuit comprises: a multiplexer having a first input coupled to the clock input, a second input, a control input coupled to the error detect input, and an output coupled to the system clock output; a further programmable delay having an input coupled to the clock input and an output coupled to a second input of the multiplexer; wherein the multiplexer is configured to couple the second input to the output in response to an error being detected and to couple the first input to the output in response to no error being detected.

In some embodiments, the timing correction circuit comprises at least one of a power supply adjustment circuit and a body bias circuit adjustment, wherein the timing correction circuit is configured to adjust at least one of the power supply and the body bias in response to an error being detected.

In some embodiments, the timing error detection and correction circuit may be included in an integrated circuit comprising a data-path comprising at least one logic gate, the data-path being arranged between a first set of flop-flops comprising the first flip-flop and a second set of flop-flops comprising the second flip-flop.

In a second aspect, there is provided a method of designing an integrated circuit comprising: a clock unit configured to receive a reference clock and to provide a delayed reference clock; a data-path comprising at least one logic gate, the data-path being arranged between an output of a first flop-flop and an input of a second flip-flop; a plurality of transition detectors coupled to a respective node on the data-path and configured to detect a data value transition on the respective node; an error detection circuit coupled to the transition detector and the clock unit and configured to detect an error in response to a data value transition being detected during a time period between a transition of the reference clock and a corresponding transition of the delayed reference clock; a timing correction circuit coupled to the error detection circuit and configured to output a system clock derived from the delayed reference clock and to provide the system clock to the first flip-flop and the second flip-flop and wherein the timing correction circuit is further configured to adapt the system clock in response to an error being detected, the method comprising: placement and routing of the logic cells of the design; identifying cells on critical timing paths corresponding to data-path nodes; placing the plurality of the transition detectors; identifying clusters of transition detectors; placing circuit elements of the error detector dependent on the clusters; connecting the transition detectors to the data-path nodes and the error detector.

In a third aspect, there is provided an integrated circuit comprising a data-path being arranged between an output of a first set of flop-flops and an input of a second set of flip-flops, and a timing error detection and correction circuit comprising: a clock unit configured to receive a reference clock and to provide a delayed reference clock; a plurality of transition detectors, each transition detector coupled to a respective node on the data-path and configured to detect a data value transition; an error detection circuit coupled to the transition detector and the clock unit and configured to detect an error in response to a data value transition being detected by one or more of the plurality of transition detectors during a time period between a transition of the reference clock and a corresponding transition of the delayed reference clock; a timing correction circuit coupled to the error detection circuit and configured to output a system clock derived from the delayed reference clock and to provide the system clock to the first flip-flop and the second flip-flop and wherein the timing correction circuit is further configured to adapt the system clock in response to an error being detected.

In some embodiments, the respective data-path nodes have a path delay to at least one the second set of flip-flops of less than 20 percent of the reference clock period.

In some embodiments, the time period between a transition of the reference clock and a corresponding transition of the delayed reference clock is the time period between a rising edge of the reference clock and the next rising edge of the delayed reference clock.

In some embodiments, the time period between a transition of the reference clock and a corresponding transition of the delayed reference clock is the time period between a falling edge of the reference clock and the next falling edge of the delayed reference clock.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION

Figure 1:
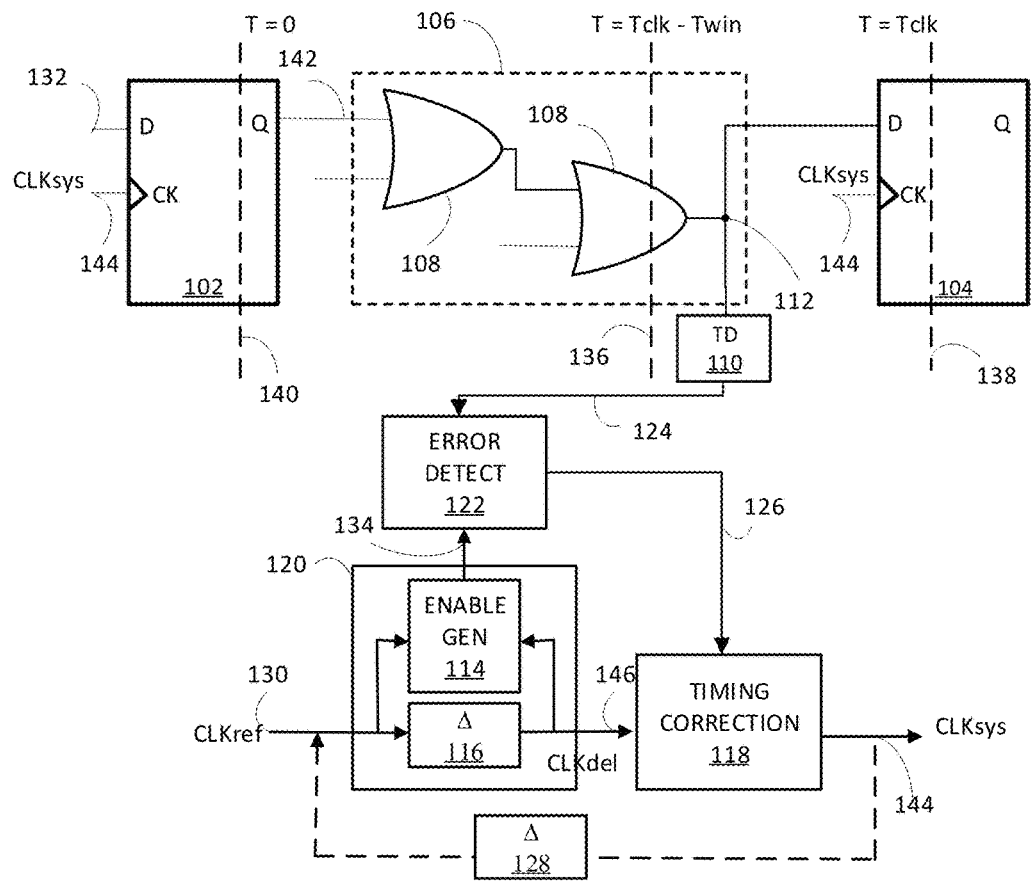
FIG. 1 illustrates an integrated circuit including a timing error detection and correction circuit according to an embodiment.

FIG. 1 shows an integrated circuit 100 including a timing error detection and correction circuit (EDaC) according to an embodiment. Integrated circuit 100 includes a first flip-flop 102, a second flip-flop 104 and a data-path 106 including one or more logic gates 108 arranged between an output of the first flip-flop 102 and an input of the second flip-flop 104. The first flip-flop 102 and the second flip-flop 104 are supplied by a system clock ($CLK_{sys}$) which is provided from a system clock output 144 of a timing corrector 118.

Integrated circuit 100 further includes a transition detector (TD) 110 having an input coupled to a data-path node 112 in the data-path 106 and a transition detector output 124 connected to an input of an error detector 122. The term data-path as used herein may be considered to refer to combinational logic circuitry arranged between sequential logic circuits such as flip-flops, or latches.

One transition detector 110 is shown in integrated circuit 100 but in other examples multiple transition detectors may be used connected to respective data-path nodes. The error detector output 126 of the error detector 122 may be connected to a control input of the timing corrector 118. A clock unit 120 may include an enable generator 114 and a delay module 116. A clock reference input 130 may be connected to the input of the delay module 116 and the input of the enable generator 114. A delay clock output 146 of the delay module 116 may be connected to an input of the timing corrector 118 and a second input of the enable generator 114. An enable generator output 134 may be connected to an input of the error detector 122. Optionally the system clock output 144 may be connected to the clock reference input 130 by a delay 128.

In operation a reference clock $CLK_{ref}$ may be provided to a reference clock input 130 of the clock unit 120. The delay element 114 may delay the reference clock signal and provide a delayed version of the reference clock $CLK_{del}$ to the delay clock output 146. The delayed clock $CLK_{del}$ may be received by the timing corrector 118 which may provide a system clock $CLK_{sys}$ derived from the delayed clock $CLK_{del}$. Where no timing correction is required, $CLK_{sys}$ may be the same as $CLK_{del}$.

The clock unit 120 may generate an enable signal on the enable signal output 134 to enable the error detector 122. The enable signal may have a pulse width corresponding to the delay between a clock transition of the reference $CLK_{ref}$ and the subsequent transition of the delayed clock $CLK_{del}$. The pulse width of the enable signal therefore corresponds to the delay of the delay element 116, and defines an evaluation time period towards the end of each clock period just before data is captured by the second flip-flop 104. The enable pulse should be as short as possible but sufficient to allow the propagation of the transition pulse through the error detector. In some examples, the delay element may be tuneable or programmable to adjust the amount of delay.

In normal operation of the integrated circuit 100, data received on the data input 132 of the first flip-flop 102 is clocked on an edge or transition of the system clock $CLK_{sys}$ provided by the timing corrector 118 at the beginning of a clock period at a time T=0 illustrated by dashed line 140. Any resulting output logic transitions may propagate through the data-path 106 to the second flip-flop 104. The result of the logical operations on the data may be captured at the data input of the second flip-flop 104 at a subsequent transition of the system clock $CLK_{sys}$ corresponding to the end of the clock period at time $T_{clk}$ shown by dashed line 138. The transition detector 110 is connected to a data-path node 112 which has a path delay between the first flip-flop 102 and the second flip-flop 104 within a timing window $T_{win}$ which is towards the end of the clock period at time $T_{clk}$. The selection of the node 112 may be determined during the physical design phase of the integrated circuit for example from the static timing analysis of path delays through the data-path. The transition detector 110 may output a pulse each time there is a transition on the data-path node 112. A transition may correspond to either a logic 0 to logic 1 data transition or vice versa.

If the transition detector 110 outputs a transition during the enable signal active period corresponding to evaluation period, this transition is captured by the error detector 122 and is considered a late timing transition which results in a timing error. The timing error may result in a data error as the second flip-flop 104 may not capture the correct data value at the next transition of the system clock $CLK_{sys}$ at $T=T_{clk}$. The error detector 122 may output an error detect signal to the timing corrector 118. In response the timing corrector may adapt the system clock CLKsys for example by clock gating or clock stretching to delay the system clock transition and so correct the timing error.

The inventors of the present disclosure have appreciated that by detecting transitions in a timing window towards the end of a clock cycle, for example within the last 20% of the clock time period, the integrated circuit 100 including the Error Detection and Correction (EDaC) system may enable the implemented digital design to run at superior power-performance levels compared to a worst-case design-margined design.

The integrated circuit 100 may have reduced energy per operation at constant speed. With the proposed solution, the digital power supply voltage can be further reduced without compromising operating frequency until point-of-first-failure as compared to a conventional design-margined design. Energy savings of almost 30% have been observed for an example low voltage design under typical process and temperature conditions.

Alternatively the operating speed for the integrated circuit 100 may be increased above the sign-off frequency of the conventional design-margined design. In some examples, the integrated circuit 100 may operate at frequency increase of up to 20% have been observed for an example design under typical PVT conditions. In other examples, depending on the original design margins, the frequency may be in the order of 100% to 200%.

Typically, dynamic power-performance management is employed in many ICs. In the majority of cases, a replica circuit for example a ring-oscillator or delay line is used to obtain a reference silicon speed performance for the given IC sample for error detection which may have mismatches in delays with respect to the actual circuit.

In contrast the integrated circuit 100 does not require any replica circuits, but the actual critical paths are monitored instead by one or more transition detectors. Consequently there is no mismatch between performance of replica circuit and actual critical circuit paths. This may result in a reduced timing margin that can be used to achieve lower power and higher speed.

Some error detection correction methods require double sampling which imposes a hold-constraint equal to their timing window. Fixing this hold constraint requires hold padding causing a power overhead as well as a potential area overhead. This reduces the maximum power savings that can be achieved. In fact, the power consumption of an integrated circuit with such an EDaC system using double sampling may be comparable or higher than an integrated circuit without EDaC.

In contrast, because critical nodes are monitored towards the end of the timing window, the error detection and correction circuit in the integrated circuit 100 may not require extra buffering to avoid hold time violations which may reduce power consumption.

Furthermore, without extra hold-padding overhead, the timing-error detection window can be much larger compared to prior art double sampling based solutions. This is because the scope of the detection is much broader as the system does not depend on the propagation of critical activity towards an endpoint, since it may monitor all of the critical activity using a number of transition detectors. This makes the proposed EDaC tuning less activity dependent and thus improves the overall robustness of the detection. The integrated circuit 100 may monitor all transitions within the predetermined timing-error detection window and not only those at endpoints of paths. Consequently, the integrated circuit 100 may also have a relatively large timing-error detection window.

Figure 2:
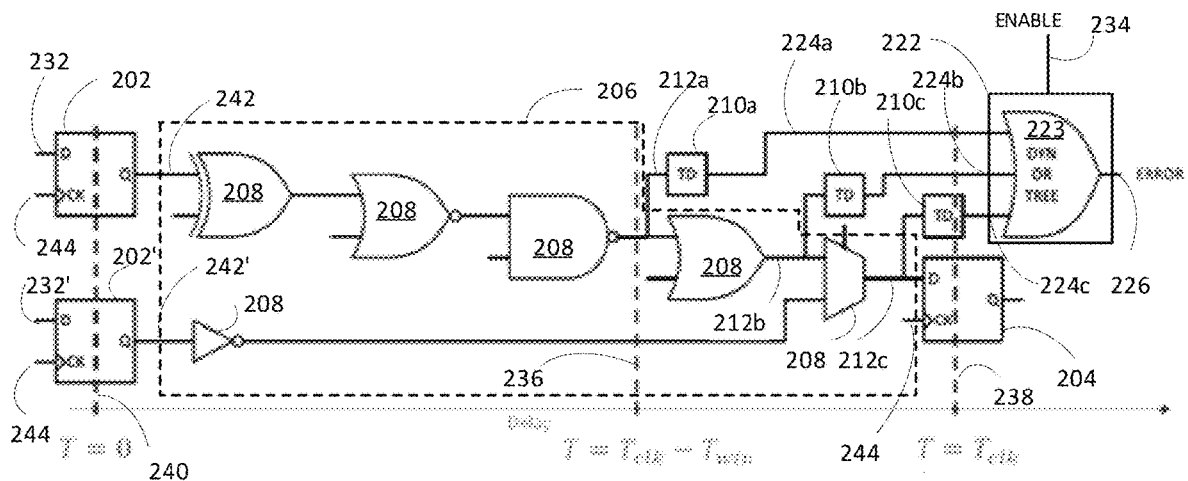
FIG. 2 shows an integrated circuit including a timing error detection and correction circuit according to an embodiment.

FIG. 2 shows an integrated circuit 200 including a timing error detection and correction circuit (EDaC) according to an embodiment. Integrated circuit 200 includes first set of flip-flops 202, 202', a second set of flip flips including flip-flop 204 and a data-path 206 including one or more logic gates 208 arranged between an output of the first flip-flops 202, 202' and an input of the second flip-flop 204. The first flip-flops 202, 202' and the second flip-flop 204 are supplied by a system clock (CLKsys) which is provided from a system clock output 244 of a timing corrector (not shown).

Integrated circuit 200 further includes a transition detectors 210a-c each having a respective input coupled to a respective data-path circuit node 212a-b in the data-path 206 and a transition detector output 224a-b connected to a respective error input of the error detector 222. The error detection output 226 may be connected to a control input of the timing corrector (not shown). The enable input 234 of the error detector may be connected to an evaluation signal generator (not shown). The error detector may include one or more dynamic OR gates 223 with each input connected to a respective transition detector output 224a-b.

In normal operation of the integrated circuit 200, data received on the respective data inputs 232 of the first flip-flops 202,202' are clocked on an edge of the system clock $CLK_{sys}$ provided at the beginning of a clock period at a time T=0 illustrated by dashed line 240. The captured data propagates through the data-path 206 and then the result of the logical operations on the data by logic gates 208 may be captured at the data input of the second flip-flop 204 at a transition of the system clock $CLK_{sys}$ corresponding to the end of the clock period at time $T_{clk}$ shown by dashed line 238. Each transition detector 210a-c is connected to a respective data-path node 212a-c which has a path delay between the first flip-flops 202,202' and the second flip-flop 204 within a timing window $T_{win}$ which is towards the end of the clock period at time $T_{clk}$. The system clock used to clock the flip flops 202,202', 204 is derived from the delayed version of the reference clock. The selection of the nodes 212a-d may be determined during the physical design phase of the integrated circuit for example from the static timing analysis of path delays through the data-path.

The transition detectors 210a-c may monitor nodes 212a-d on the final gates of the critical path. The summed propagation delay of the monitored gates determines the error detection window ($T_{win}$). This starts at the margined signoff time $T_{clk}$ and ends at the worst-case input timing of the least critical gate still included ($T_{clk}-T_{win}$). A timing error is only detected when a transition detector 210a-c flags activity towards the end of a clock cycle within an evaluation time determined by the enable signal provided to the enable input of the error detector. This enable signal is generated from the difference between the transition of the reference clock and the corresponding transition of the delayed version of the reference clock. The transition detector 210a-c may output a pulse each time there is a transition on the respective data-path node 212a-c which may correspond to either a logic 0 to logic 1 data transition or vice versa.

In response to detecting an error, a timing corrector (not shown) may adapt the system clock $CLK_{sys}$ for example by clock gating or clock stretching to delay the system clock transition and so correct the timing error.

Figure 3A:
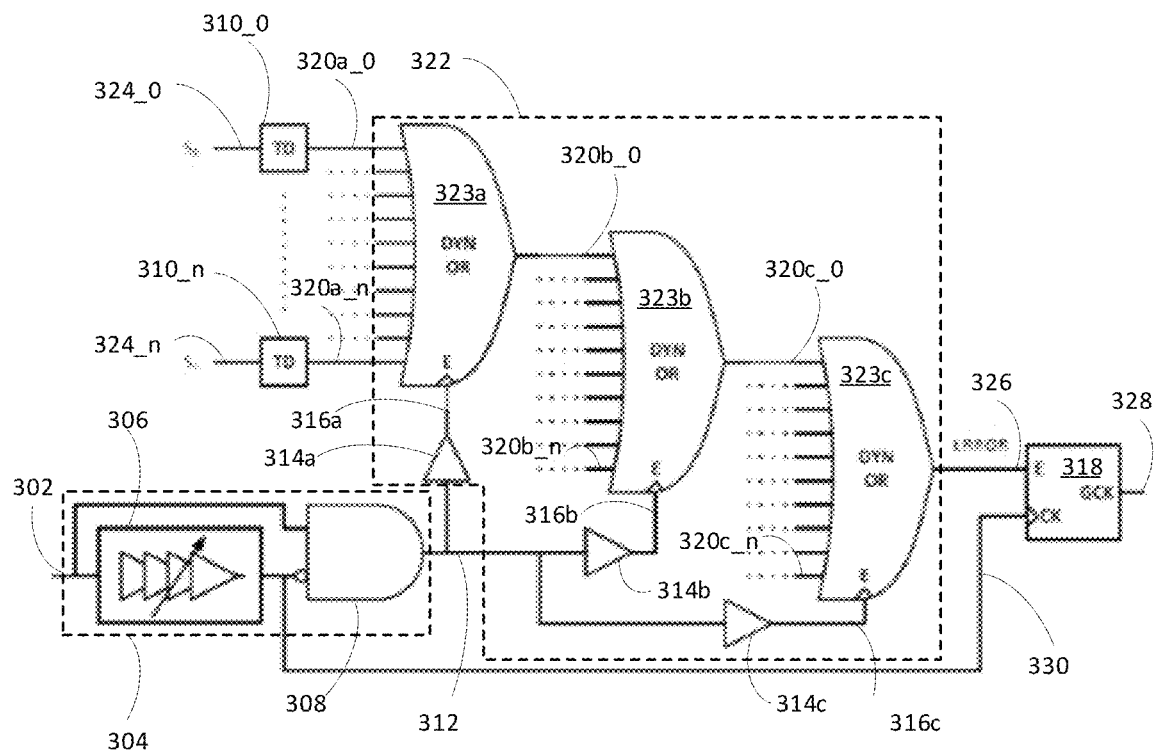
FIG. 3A shows a timing error detection and correction circuit for an integrated circuit according to an embodiment.
Figure 3B:
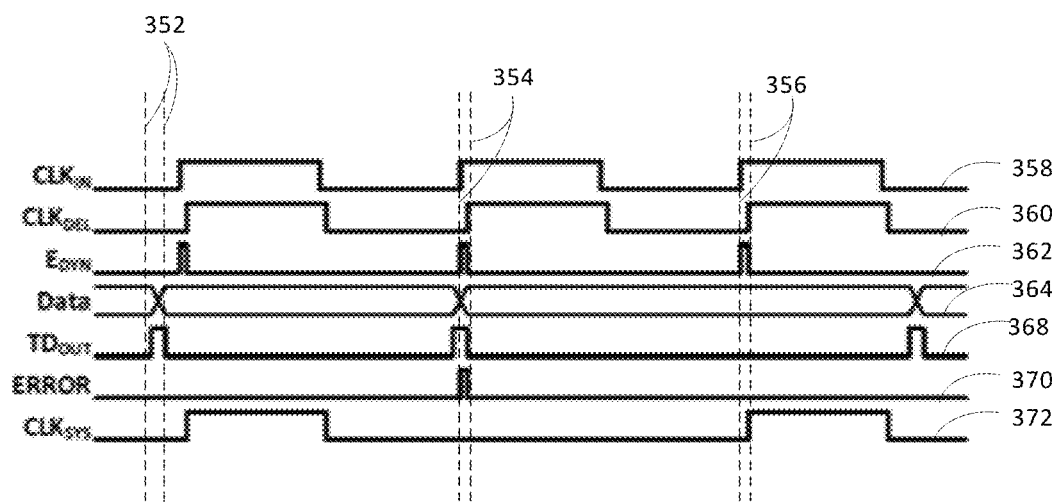
FIG. 3B shows an example waveform for the timing error detection and correction circuit of FIG. 3A.

FIG. 3A shows a timing error detection and correction system for an integrated circuit 300 according to an embodiment. The timing error detection and correction system 300 includes an error detector 322 having a three-stage dynamic OR gate 323a-c each OR gate 323a_c has a number of inputs 320a_0 to 320s_n, 320b_0 to 320b_n, 320c_0 to 320c_n. Other example error detectors may have fewer or more stages. The timing error detection and correction system 300 includes a number of transition detectors 310_0 to 310_n having a respective input coupled to a respective data-path node 324_0 to 324_n in a data-path (not shown). The output of each of the transition detector may be connected to a respective OR gate input 320a_0 to 320a_n of the first stage dynamic OR gate 323a. The output of the first stage dynamic OR gate 323a may be connected to the first input 320b_0 of a second stage dynamic OR gate 320b. The remaining inputs of the second stage dynamic or gate 320B may be connected to further transition detectors (not shown) or other first stage dynamic or-gate (not shown). The output of the second stage dynamic or gate 323b may be connected to a first input 320c_0 of a third stage dynamic OR gate 323c. The remaining inputs of the third stage dynamic or gate 323c may be connected to further transition detectors (not shown) or other first and second stage dynamic or-gate outputs. The output of the third stage dynamic or gate 323c may be connected to the error detector output 326. The dynamic or gates 323a, 323b, 323c, may have respective enable inputs 316a, 316b, 316c. The enable inputs 316a-c may be connected to the evaluation signal output 312 of a clock unit 304 via respective buffers 314a, 314b, and 314c.

The clock unit 304 may include a programmable delay 306, and a logic element 308 for example an AND gate with one noninverting input and one inverting input. The reference clock input 302 may be connected to the noninverting input of the and gate 308. The output of the programmable delay 306 may be connected to the delay clock output 330 and the inverting input of the AND gate 308.

The error detector output 326 of the error detector 322 may be connected to a control input of the timing corrector 318. The delay clock output 330 may be connected to an input of the timing corrector 318.

In operation a reference clock $CLK_{ref}$ may be provided to a reference clock input 302 of the clock unit 304. The programmable delay element 306 may delay the reference clock signal and provide a delayed version of the reference clock $CLK_{del}$ to the delay clock output 330. The delayed clock $CLK_{del}$ may be received by the timing corrector 318 which may provide a system clock $CLK_{sys}$ derived from the delayed clock $CLK_{del}$. Where no timing correction is required, $CLK_{sys}$ may be the same as $CLK_{del}$.

The clock unit 304 may generate an enable signal on the evaluation signal output 312 to enable the error detector 322. The enable signal may have a pulse width corresponding to the delay between a clock transition of the reference $CLK_{ref}$ and the subsequent transition of the delayed clock $CLK_{del}$. The pulse width of the enable signal corresponds to the delay of the programmable delay 306. The enable signal pulse may control the error detector 322 to take a snapshot of all transition detector outputs. If any of the transition detector outputs are active during the enable pulse then this is considered as a timing error and the error detector output may indicate an error condition.

If a timing error is detected, the error condition signal may be latched on the next transition of the delayed clock $CLK_{del}$. The timing corrector 318 may gate the system clock output 328 so that the clock is delayed by one cycle. This prevents the timing-error from being captured by the receiving flip-flop and therefore acts as a single cycle correction mechanism. The dynamic-or gate may be designed to fit in the digital standard cell template, for ease and efficient design integration.

An example timing waveform 350 of the operation of the EDAC system 300 is shown in FIG. 3A. $CLK_{IN}$ 358 is the input reference clock from which the evaluation signal 362 of the or-gates (Edyn pulse) and the delayed clock 360 ($CLK_{DEL}$) are derived. The system clock 372 ($CLK_{SYS}$) is in-sync with $CLK_{DEL}$. The width of the evaluation signal Edyn pulse 362 is equal to the time difference between the rising edge of $CLK_{DEL}$ and $CLK_{IN}$ as shown by regions 354, 356 and corresponds to the time in which possible timing errors are evaluated which is just before the next transition of $CLK_{DEL}$ The ERROR signal 370 output by the error detector 322 is generated when the data toggling is captured by the transition detectors 324_0 to 324_n at the moment that Edyn is high. This means that at least one of the transition detectors 324_0 324_ns have captured activity just before the clock edge of $CLK_{DEL}$. An example output is shown by waveform 368 (TDout). This error condition is illustrated in the time region 354 whereas, by contrast, in region 356 no transitions are detected during the evaluation snapshot and so no error signal is output. The system clock 372 is gated following error detection by the timing corrector 318. The pulse width 352 of the transition detector output pulse should be just large enough to be captured by the or-tree of the error detector 322 if it is present during the evaluation pulse Edyn. However, this does not mean that it should be larger or equal than the Edyn pulse itself. A relatively short output pulse which has a pulse width less than the propagation delay of the or-tree can still ripple through the or-tree so the exact minimum width of this pulse depends on the actual implementation of the or-tree.

Figure 4A:
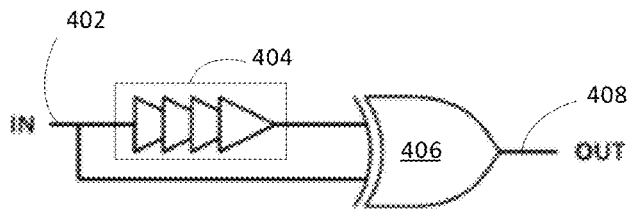
FIG. 4A shows an example implementation of a transition detection circuit.

FIG. 4A shows an example of a transition detector 400 which may be used as a transition detector in any of the error detectors described herein. The transition detector 400 includes a series arrangement of buffers 404 between an input and a first input of an exclusive OR gate 406. A second input of the exclusive OR gate 406 is connected directly to the input 402. The output of the EXOR gate 406 is connected to the output of the transition detector 400.

Figure 4B:
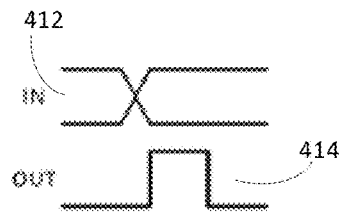
FIG. 4B shows an example timing waveform of the transition detection circuit FIG. 4A.

In operation the input 402 is connected to a monitored data-path circuit node (not shown). The output 408 provides a pulse in response to data toggling at the monitored circuit node i.e. a data transition between a logic 0 and logic 1 or vice-versa. The related signal waveforms 410 are shown in FIG. 4B. Waveform 412 shows the data transition at the input 2-3 and waveform. The width of the pulse 414 equals the propagation delay of the buffers 404 that are present in one of the input lines of the XOR gate.

Figure 5:
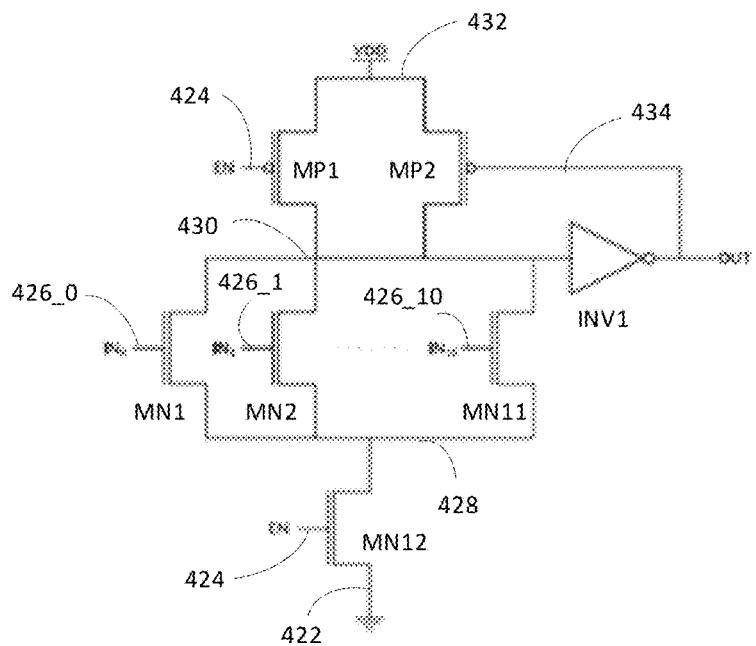
FIG. 5 shows an example dynamic or gate implementation.

FIG. 5 shows a typical dynamic OR gate 420 which may be included in one or more of the detector circuits described herein. The dynamic OR gate 420 includes a parallel arrangement of a pre-charge PMOS transistor MP1 and a hold PMOS transistor MP2 between a supply node for 432 and a circuit node 430. An input of the pre-charge PMOS transistor MP1 is connected to the enable input 424. An input of an inverter INV1 may be connected to the circuit node 430.

An output of the inverter INV1 may be connected to the dynamic OR gate output 434. The OR output 434 may also be connected to the input of the hold transistor MP2. The dynamic or gate has a parallel arrangement of NMOS transistors MN1, MN2, MN11 having a drain connection to the circuit node 430 and a source connection to a circuit node 428. The gates of each of the transistors MN1, MN2 and MN11 are connected to a respective input of the dynamic or gate 426_0 426_1, 426_10. A discharge transistor MN12 has a source connection to a ground rail 422 and a drain connection to the circuit node 428. The gates of the discharge transistor MN12 may be connected to the enable input 424. In operation when used in an error detector, the dynamic OR gate may output a logic 1 during an evaluation phase if any of the inputs are a logic 1. In other examples dynamic or gates may have fewer or more than the 11 inputs shown in dynamic or gate 420.

Figure 6:
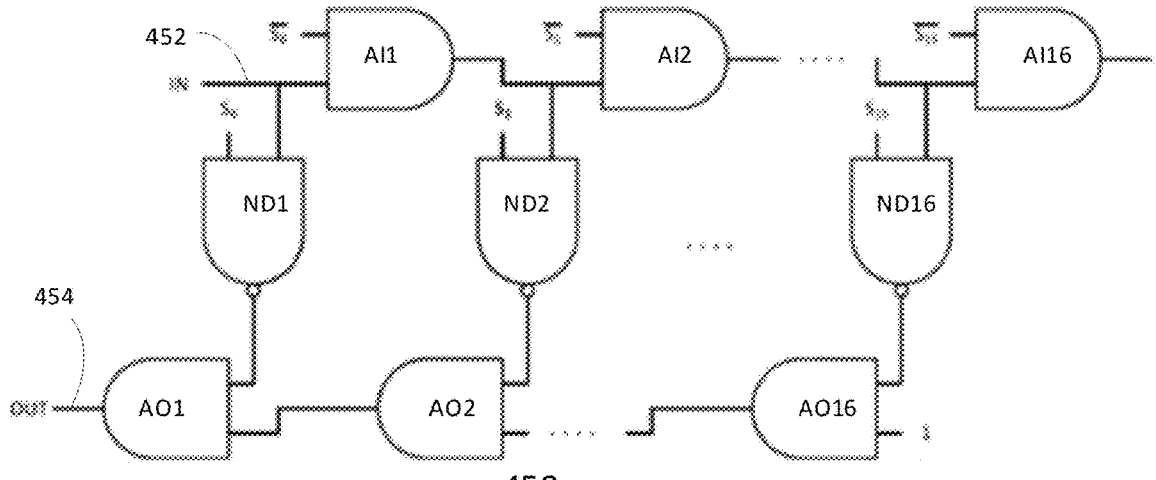
FIG. 6 shows an example programmable delay line.

FIG. 6 shows an example of a programmable delay 450. A programmable delay input 452 may be connected to a first AND gate AI1 of a series arrangement of AND gates AI1, AI1, AI16. One of the inputs of each of the first series of AND gates is connected to a respective input of a NAND gate ND1, ND2, ND16. A second input of each of the t AND gates AI1, AI2 is connected to the inverse of an output from 1 bit of a programmable register (not shown) denoted $\overline{S0}$, $\overline{S1}$, $\overline{S15}$. A second input of each of the NAND gates is connected to a respective output from 1 bit of a programmable register (not shown) denoted S0, S1, S15. An output of each NAND gate is connected to a respective input of a second series arrangement of AND gates AO16, AO22, AO11. A second input of AND gate AO16 is connected to a logic 1. An output of AND gate AO1 is connected to the output of the programmable delay 454. In operation the delay between the input 452 and the output 454 may be determined by which of the values of S0 . . . S15 set by a programmable register.

For example if S0 is set to logic 1 ($\overline{S0}$=0), then the delay from the input 452 to the output 454 is the delay via ND1 and AO1. If S0 is logic 0 and S1 is logic 1 then the delay from the input 452 to the output 454 is the delay via AI1, ND2, AO2 and AO1.

Figure 7:
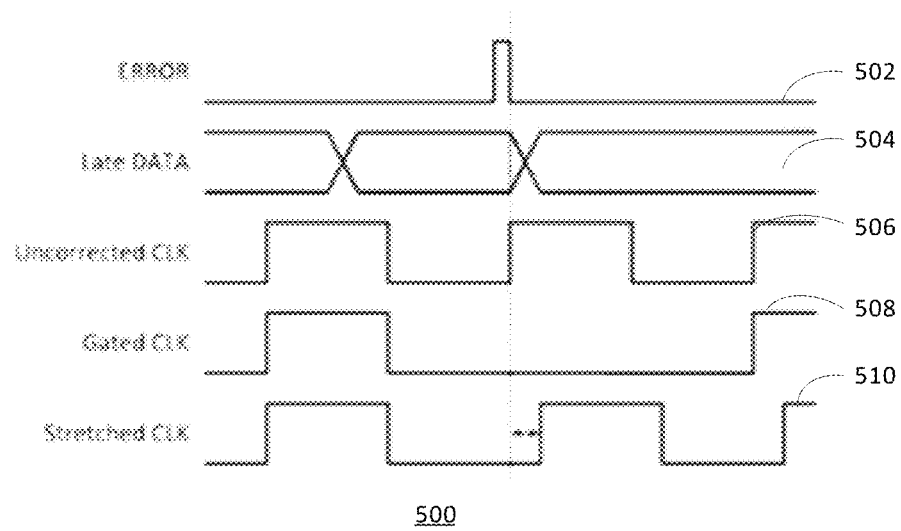
FIG. 7 shows an example of a timing diagram for different timing correction strategies.

FIG. 7 shows waveforms 500 that illustrate the operating principle of the gating clock and stretched clock for timing-error correction in one or more embodiments. The "ERROR" signal 502 concerns the output from the dynamic or-gate tree of the error detector of embodiments described herein. A timing-error is detected when the "ERROR" signal 502 is at logic' 1. In other examples it will be appreciated that logic '0' may indicate an error condition and logic '1' may indicate a fault-free condition. The "Uncorrected CLK" signal 506 is the same as the delayed clock $CLK_{DEL}$ as previously discussed. The "ERROR" signal 502 is evaluated from the time between the reference CLK being asserted until the delayed clock is asserted, i.e. the delay time of the programable delay line. The "Late DATA" signal 504 shows toggling of the monitored gates by the transition detectors. When toggling is ongoing at the moment the dynamic-or gates are enabled, a timing error is flagged by asserting the "ERROR" signal. Waveform 508 shows the response of clock gating to an error signal which delays the next clock for $CLK_{sys}$ until the following cycle of the uncorrected clock. Waveform 510 shows a stretched clock response which may extend the current clock cycle for $CLK_{sys}$.

Figure 8A:
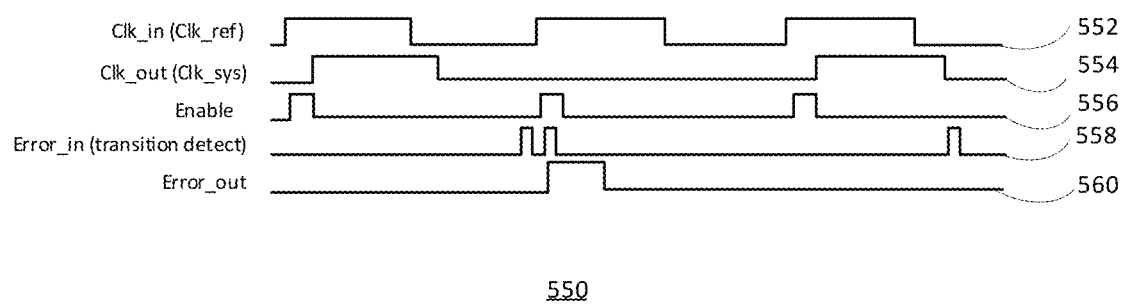
FIG. 8A shows an example waveform showing the timing correction behaviour.
Figure 8B:
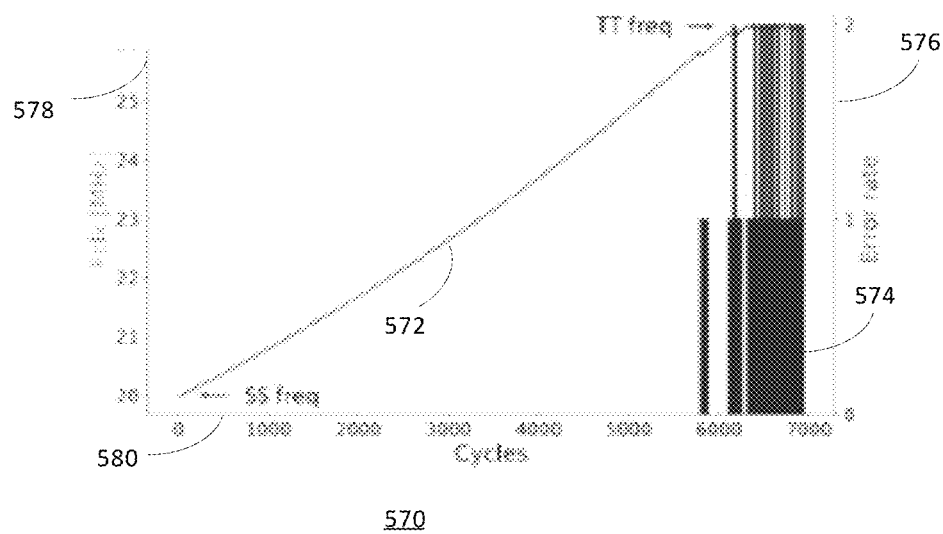
FIG. 8B shows an example behaviour of the timing waveform error detection and correction circuit according to one or more embodiments.

FIG. 8A shows waveforms 550 and FIG. 8B shows a graph 570 of the example of behaviour of embodiments of the error detection and correction system. Waveforms 550 include the reference clock 552, the system clock 554, the error detect enable signal 556, the ORed output of transition detectors 558 and the detected error signal 560.

Turning to FIG. 8B, at time t=0, the applied system clock frequency of the digital core equals the slow corner scenario (SS) of process, voltage and temperature frequency of 20 MHz. In the SS scenario, no timing errors are flagged as expected. Next, the frequency is increased over time. At a given point, timing errors are flagged which indicates that digital core has reached it critical frequency i.e. the Point of First Failure (PoFF). The EDaC system reacts on this error accordingly by applying clock gating as can be seen in the signal waveforms of FIG. 8A which corresponds to the detected error "Error_in" 558 and processed error "Error_out" 560.

Figure 9:
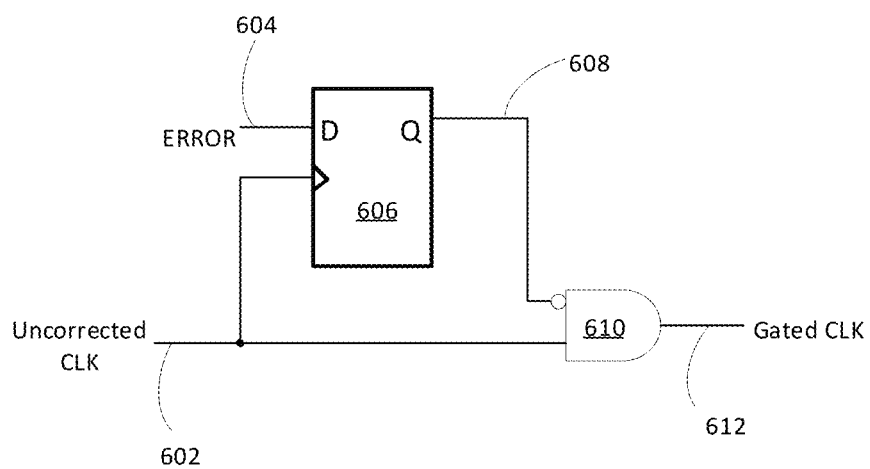
FIG. 9 shows an example clock gating circuit.

FIG. 9 shows an example clock gate circuit 600 which may be used in a timing corrector in one or more embodiments described herein. Clock gate circuit includes a flip-flop or latch 606 and gate 610. The Enable signal is captured by the flip-flop 606 clocked by the input clock clk_in ($CLK_{DEL}$) on input 602. The clk_out ($CLK_{SYS}$) 612 is gated low when the Enable signal is high. When the Enable is low, the clock gate is transparent, i.e. clk_out=clk_in.

Figure 10:
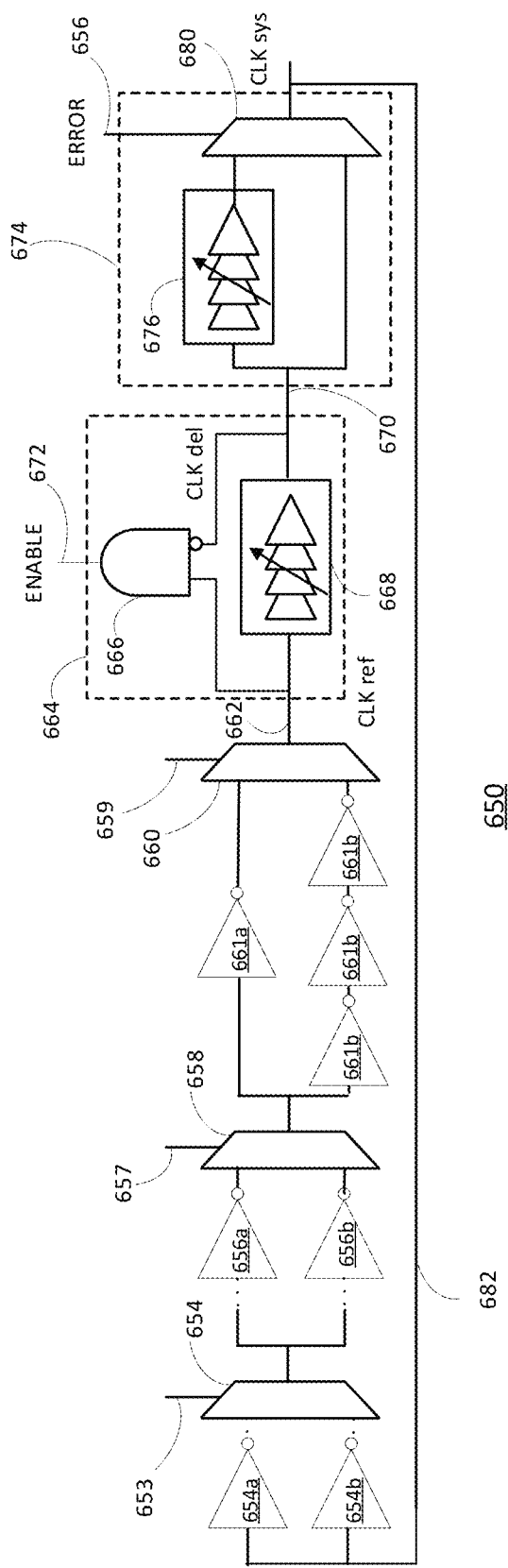
FIG. 10 illustrates a timing error detection and correction circuit according to an embodiment.

FIG. 10 shows an example error detection and correction system 650 using clock stretching for the timing correction and configured to operate as a ring oscillator. The error detection and correction system 650 includes a series arrangement of multiplexers 654, 658, 660 which are each configured to select an output from one of a respective first series of inverters 654a, 656a, 661a and second series of inverters 654b, 656b and 661b. Each series of inverters may include different number of inverters. In other examples, combinations of buffers and inverters may be used. The output of the multiplexer 660 may be connected to the reference clock input 662 of a clock unit 664. Multiplexers 654, 658 and 660 may have respective control inputs 652, 657 and 658 to independently select which input, to use thereby allowing adjustment of the clock frequency of the ring oscillator.

The clock unit 664 may include a delay 668 which may be a programmable delay, and a logic circuit element 666 for example an AND gate with one noninverting input and one inverting input. The reference clock input 662 may be connected to the noninverting input of the AND gate 666. The output of the delay 676 may be connected to the delay clock output 670 and the inverting input of the AND gate 666. The output of the AND gate 666 is connected to the evaluation signal output 672 which may be connected to an error detector (not shown).

The delay clock output 670 may be connected to an input of a timing corrector 674. The timing corrector 674 may include a programmable delay 676 arranged between the delay clock output 670 and a first input of a timing corrector multiplexer 680. The second input of the timing corrector multiplexer 680 may be connected directly to the delayed clock output 670. The output of the timing corrector multiplexer may be connected to the system clock output 682. The system clock output may also be connected to the inputs of the first series of inverters 654a and the second series of inverters 654b. This feedback path may result in the error detection and correction system 650 implementing a ring oscillator function. The control inputs of the timing corrector multiplexer 680 may be connected to the output 656 of an error detector (not shown).

In operation the error detection and correction system 650 may generate an enable signal on the enable output 672 which is used to enable an error detector for a an evaluation period just before a clock transition of the delay clock $CLK_{del}$. The detected error signal may control the system clock multiplexer 680 of the timing corrector 674 to select the clock system $CLK_{sys}$ from the delayed path through the programmable delay 676 thereby stretching the clock cycle. The system clock output is used to clock flip-flops with a data-path between as described herein for other embodiments.

The error detection and correction system 650 implements a ring-oscillator which may prevent the clock cycle immediately following the corrected (stretched) clock cycle becoming too short as this may result in unwanted timing errors. Moreover, the ring-oscillator based clock can correct for global PVT variations while the EDaC system corrects the local variations. In case of a ring-oscillator, the detection window should cover any mismatch between monitored data-path and ring oscillator.

Figure 11:
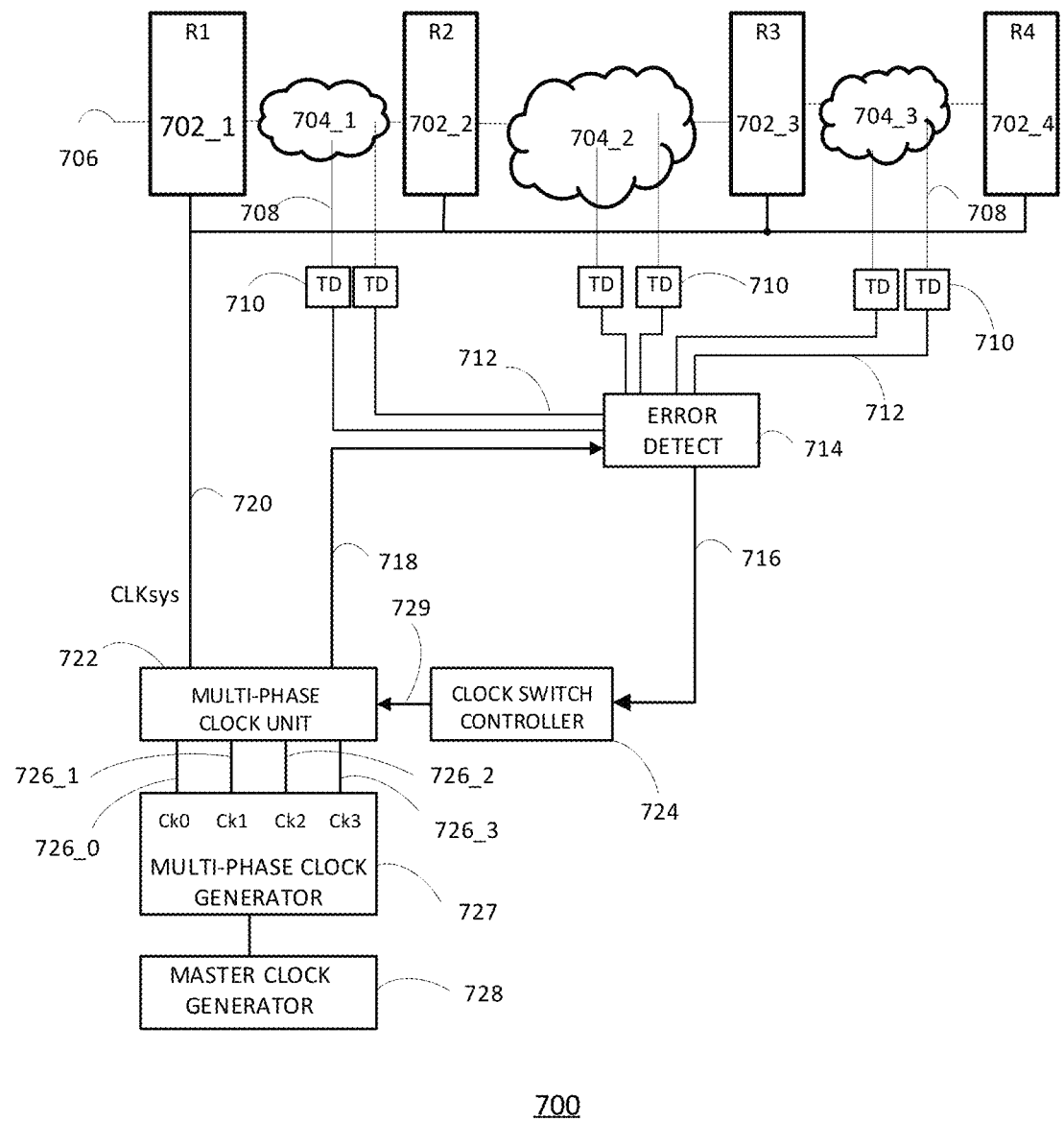
FIG. 11 illustrates an integrated circuit including a timing error detection and correction circuit according to an embodiment.

FIG. 11 shows an integrated circuit 700 including an error detection and correction system according to one or more embodiments. The error detection and correction system shown in integrated circuit 700 uses clock stretching with multiphase clocks.

Integrated circuit 700 includes registers 702_1, 702_2, 702_3, 702_4 which may include a set of one or more flip-flops clocked by a system clock. Logic data-paths 704_1, 704_2 and 704_3 may be arranged between the registers 702_1, 702_2, 702_3, 702_4. Transition detectors 710 may have inputs connected to critical nodes 708 within the respective logic data-paths 704_1 704_2 and 704_3. The transition detectors 710 have an output 712 connected to a respective input of an error detector 714. An output 716 of the error detector 714 may be connected to an input of the clock unit control 724. The error signal selection 729 output from the clock unit control 724 may be connected to an input of the multiphase clock unit 722. The multiphase enable signal generated may output a system clock 720 which is connected to each of the registers 702_1, 702_2, 702_3, and 702_4. The multiphase clock unit 722 may have an enable signal output connected to the error detector 714.

A master clock generator 728 may have an output connected to a multiphase clock generator 727. As illustrated multiphase clock generator 727 generates four clock phases on a respective output 726_0 (CLK—0%), 726_1 (CLK2—25%), 726_2 (CLK3—50% phase shift), and 726_3 (CLK4—75% phase shift) which is connected to respective multiphase enable signal generator inputs.

Figure 12A:
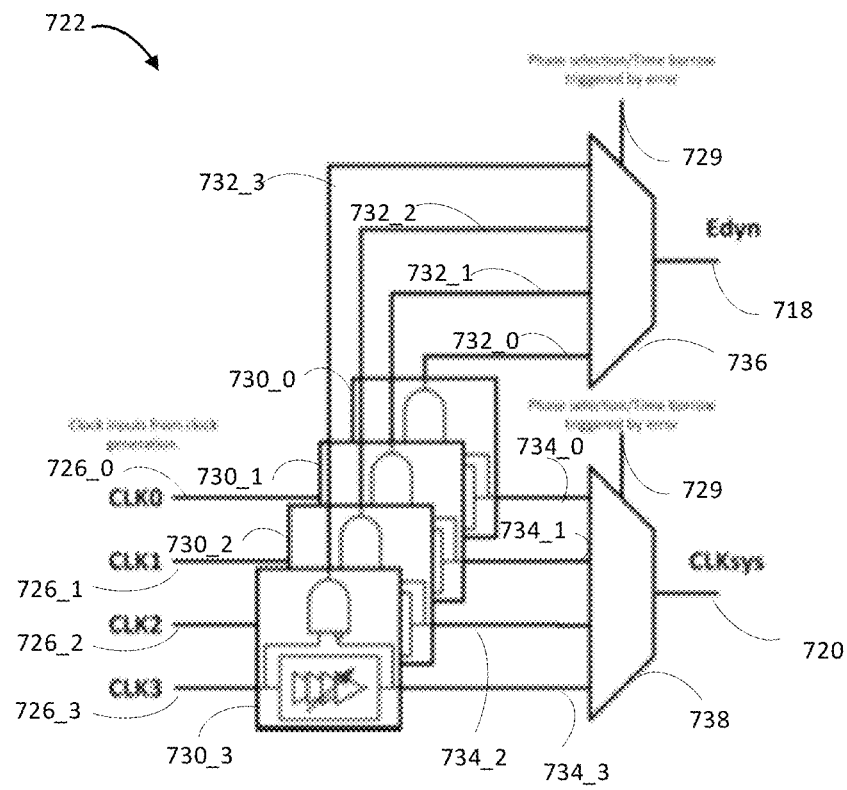
FIG. 12A illustrates a multi-phase clock unit for the timing error detection and correction circuit of FIG. 11.

FIG. 12A shows an example implementation of the multiphase clock unit 722. The respective outputs from the multiphase clock generator 726_0, 726_1, 726_2, and 726_3 are connected to single phase clock units 730_0, 730_1, 730_2, and 732_3 which each output an enable signal on respective enable signal output 732_0, 732_1, 732_2, and 732_3 for the respective clock phase and a delayed version of the respective clock phase on outputs 734_0, 734_1, 734_2, and 734_3. Delayed clock outputs 734_0, 734_1, 734_2, and 734_3 may be connected to respective inputs of a system clock multiplexer 738. The output of the system clock multiplexer 738 may be connected to the system clock output 720. Enable signal outputs 732_0, 732_1, 732_2, and 732_3 may be connected to respective inputs of the enable signal multiplexer 736. The output of the enable signal multiplexer may be connected to the enable signal output 718. The control inputs of the enable signal multiplexer 736 and the system clock multiplexer 738 may be connected to the error signal selection 729.

Figure 12B:
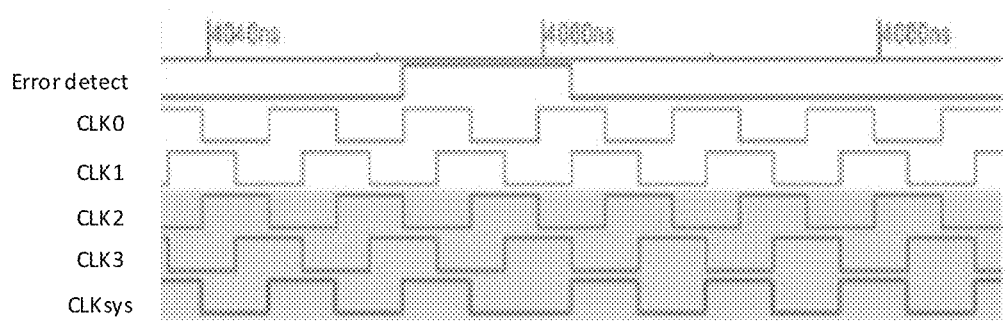
FIG. 12B shows an example waveform for the multi-phase clock unit of FIG. 12A.

FIG. 12B shows an example of the operation 750 of the error detection system in the integrated circuit 700. Initially the system clock is generated based on the first clock phase denoted CLK0. One or more of the transition detectors 710 may detect a transition within a predetermined time window towards the end of the period of the system clock phase CLK0 which is considered a timing error. Following the detection of the timing error, the enable signal generator control 724 may select the next clock phase to the current clock phase being used, which in this case is CLK1 in order to correct the error. The system clock then continues using CLK1 as the reference clock until a subsequent timing error is being detected. If a subsequent timing error is detected then CLK2 is used.

Figure 13:
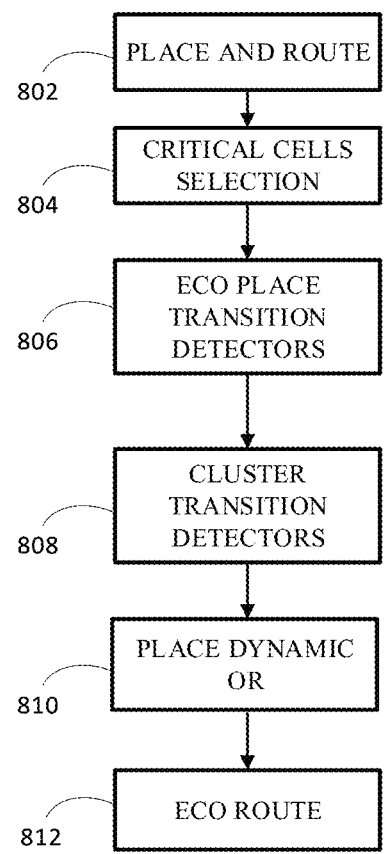
FIG. 13 shows a method of designing an integrated circuit including the timing error detection and correction circuit according to an embodiment.

FIG. 13 shows a method of designing an error detection and correction system for an integrated circuit according to an embodiment 800. In step 802 the circuit elements of the integrated circuit design are placed and routed. In step 804 critical cells in the design are selected to identify which parts of the design where transition detectors are to be inserted.

After selection of the critical cells the method moves to step 806 where the transition detectors are placed. In step 808 the transition detectors are then clustered to identify which detectors can be connected to which error detector which may for example be a dynamic OR gate. In step 810 the dynamic OR gates are placed on the integrated circuit layout. Finally in step 812 the routing of the transition detectors and error detectors to connect to the relevant data-path nodes is done. Method steps 804 which is the critical logic cell selection and step 808 where the transition detectors are clustered is an expansion of the digital design flow.

For critical cells selection 804, the preferred approach is to employ statistical static timing analysis for this purpose. This type of analysis provides both the mean and sigma of path delays under local variations. These values are used in emulated full system Monte-Carlo (MC) simulations that yield Probability Density Function (PDF) shown on the y-axis 824 for the critical timing paths on the x-axis 822 in nano-seconds over different chip samples.

Figure 14:
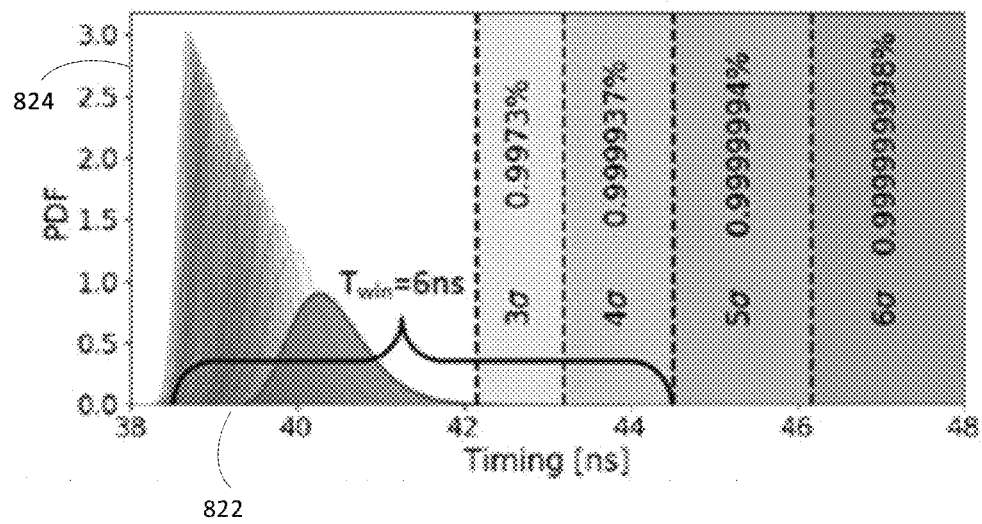
FIG. 14 shows an example plot of the most critical probability density function (PDF)s for a clock of 50 ns period and typical (TT) process voltage temperature (PVT) corner.

FIG. 14 shows an example cell selection 820 for a design designed for a worst-case 50 ns clock operation under typical process conditions. The PDFs can be used to deduce a useful timing window ($T_{WTN}$). This timing window should start at the desired yield e.g. 4σ in FIG. 14 and end when the PDFs start to fully overlap. More overlap between PDFs indicates less recovered margin per resolved timing-error.

Figure 15:
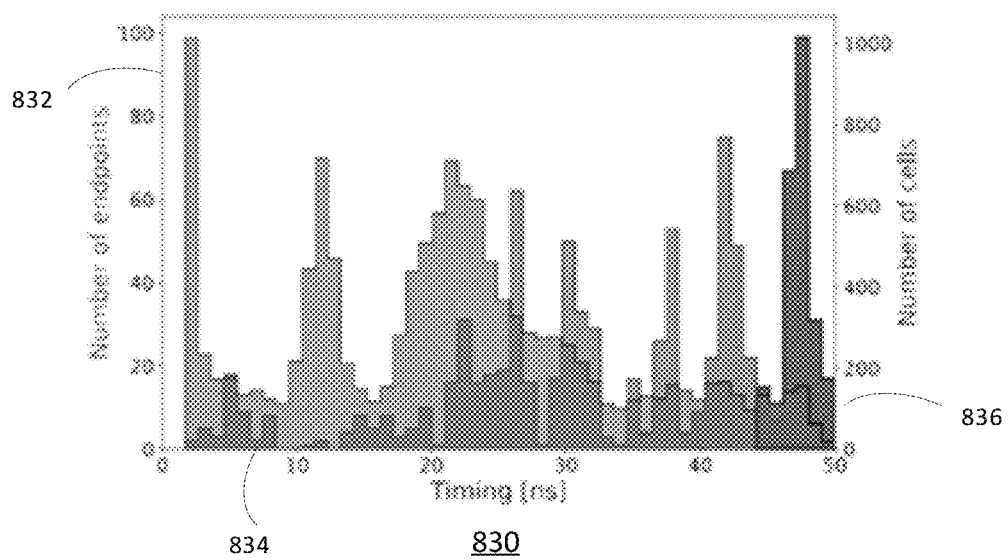
FIG. 15 illustrates endpoints and number of cells versus timing at clock and slow PVT corner for a timing window at 12% of the clock period.
Figure 16A:
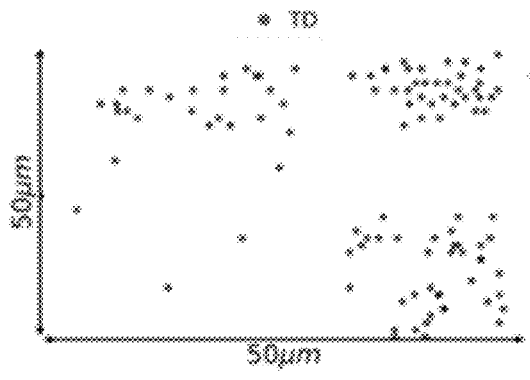
FIG. 16A shows an example of timing detection location at floorplan level of an integrated circuit including a timing error detection and correction circuit according to an embodiment.
Figure 16B:
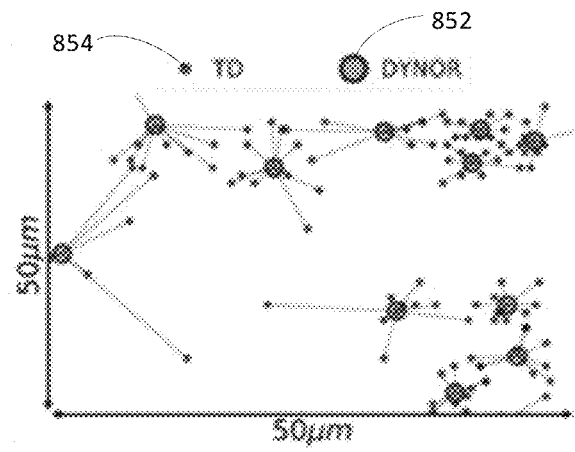
FIG. 16B illustrates a floorplan view of the integrated circuit shown in FIG. 16A showing dynamic OR gate location as well as timing detector connectivity.

In other examples the cell selection step 804 can be performed by making use of conventional static timing analysis. An example cell selection 830 is provided in FIG. 15, where the distribution of number of endpoints/cells 832 for the same design is shown under slow PVT conditions. The time window $T_{WTN}$ starts at the worst case clock period (e.g. 50 ns in FIG. 15) towards a lower clock period. The cells that are part of the critical paths within this time window are the candidates to be monitored with a respective transition detector (TD) the relevant critical paths and cells are indicated by a darker shading 834.

The inputs/outputs of the selected cells are monitored with TDs. However, one can trade-off the recovered margin, number of transition detectors required, and the amount of timing errors that need to be resolved by the EDaC system. For reducing overhead of the EDaC system, it may further be considered to monitor a subset of the total selected cells depending on signal propagation statistics and/or other redundancies in the critical paths.

The number of required TDs depends on the amount of critical cells that needs to be monitored. This amount could easily concern thousands of cells for a given digital core. The TDs that monitor the critical cells provide an error signal for is condensed toward a single ERROR signal with the help of the dynamic-or gates.

The proposed hierarchical approach limits the amount of TDs that are connected to a single dynamic-or gate in an example error detector. The first-level of dynamic-or gates may be connected a next layer of dynamic-or gates. This may reduce the overall wiring overhead and power consumption, for converging the error signal of all TDs into a single ERROR signal used for timing-error detection and correction purposes.

There exists a trade-off between the amount of inputs of the dynamic-or gate, performance of the dynamic-or gate, and the total wire length of the EDaC system. Error detectors in some embodiments may use 10-input dynamic-or gates, but in other examples dynamic or gates with fewer or more than 10 inputs may be used. The K-means algorithm can be employed to determine the placement location of the dynamic-or gates, while optimizing for lowest total wire-length. FIG. 15A shows such example for a given digital design 840 at floor plan level showing the TD. FIG. 15A shows such example for a given digital design 850 at floor plan level showing the TD locations and the respective dynamic-or gate placement.

Embodiments of the timing error correction and detection system described may be included in low power digital designs implemented on an integrated circuit that utilize runtime dynamic power-performance management. In particular, battery-powered applications can benefit from this invention. For example earing instruments, low-power connectivity solutions (e.g. wireless personal audio, IoT devices), low-power (general-purpose) microcontrollers low-power secure access products such as car keys and building access.

Moreover, since the embodiments of EDaC system provides runtime performance indication, the EDAC system can also be utilized during IC at-speed testing and/or reliability qualification. For at-speed testing, the EDaC system can be used to support validation of (critical) path performance at IC sample level. For reliability testing, embodiments of the EDaC system can be used to monitor circuit performance degradation during high temperature operating life (HTOL) testing. Such information can be used to reduce the total IC qualification time without impacting accuracy/ppm levels.

It will be appreciated that logic transitions from 0 to 1 described in detailed embodiments herein may be replaced by 1 to 0 transitions in other embodiments having different detailed implementation.

An integrated circuit and method of designing an integrated circuit including an error detection and correction circuit is described. The integrated circuit includes a data-path being arranged between an output of a first register and second register clocked by a system clock. The integrated circuit includes a timing error detection and correction circuit (EDAC) which has a clock unit configured to receive a reference clock and to provide a delayed reference clock. The EDAC includes a plurality of transition detectors coupled to a respective node on the data-path and an error detection circuit coupled to each transition detector. The nodes are selected during the design according to a desired timing window to be monitored. The error detection circuit flags an error if a transition occurs during a snapshot corresponding to a time period between a transition of the reference clock and a corresponding transition of the delayed reference clock. A timing correction circuit coupled to the error detection circuit outputs the system clock derived from the delayed reference clock. The timing correction circuit is further configured to adapt the system clock in response to an error being detected.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

TABLE OF REFERENCE SIGNS

| | |
|---|---|
| 100 | Integrated circuit including a timing error detection and correction circuit |
| 102 | First Flip flop |
| 104 | Second Flip flop |
| 106 | Data-path |
| 108 | Logic gate |
| 110 | Transition detector |
| 112 | Data-path node |
| 114 | Enable generator |
| 116 | Delay element |
| 118 | Timing corrector |
| 120 | Clock unit |

| | |
|---|---|
| 122 | Error detector |
| 124 | Transition detector output |
| 126 | Error detection output |
| 128 | (optional) timing clock delay |
| 130 | Reference clock input |
| 132 | First flip flop input |
| 134 | Enable generator output |
| 136 | Start of timing detection window |
| 138 | End of clock period |
| 140 | Start of clock period |
| 142 | First flip flop output |
| 144 | System (corrected) clock output |
| 146 | Delay clock output |
| 200 | Integrated circuit including a timing error detection and correction circuit |
| 202, 202' | First flip-flops |
| 206 | Datapath |
| 208 | Logic gates |
| 210a, 210b, 210c | Transition detectors |
| 212a, 212b, 212c | Datapath nodes |
| 222 | Error detector |
| 223 | Dynamic OR tree |
| 224a, 224b, 224c | Transition detector outputs |
| 226 | Error detection output |
| 234 | Enable generator output |
| 236 | Start of timing detection window |
| 238 | End of clock period |
| 240 | Start of clock period |
| 242, 242' | First flip flop output |
| 244 | System (corrected) clock output |
| 300 | Integrated circuit |
| 302 | Reference clock input |
| 304 | Clock unit |
| 306 | Programmable delay |
| 308 | AND gate |
| 310_0, 310_n | Transition detectors |
| 312 | Evaluation signal output |
| 314a, 314b, 314c | buffers |
| 316a, 316b, 316c | OR enable inputs |
| 318 | Timing corrector |
| 320a_0, 320a_n, 320b_0, 320a_n, 320c_0, 320c_n | Dynamic OR inputs |
| 322 | Error detector |
| 323a, 323b, 323c | Dynamic OR gates |
| 3240, 324_n | Datapath nodes |
| 326 | Error detector output |
| 328 | System (corrected) clock |
| 330 | Delay clock output |
| 350 | Integrated circuit waveforms |
| 352 | Pulse width of transition detector, transition detected but outside evaluation window |
| 354 | Error detection condition |
| 356 | Pulse width of evaluation window, evaluation, no transition detected. |
| 358 | Clock in |
| 360 | Delayed clock |
| 362 | Evaluation signal |
| 364 | Data |
| 368 | Transition detection |
| 370 | Error detection out |
| 372 | System clock |
| 400 | Transition detector |
| 402 | Transition detector input |
| 404 | Delay |
| 406 | Exclusive OR |
| 408 | Transition detector output |
| 410 | Transition detect waveforms |
| 412 | Input waveform |
| 414 | Output waveform |
| 420 | Typical dynamic OR gate |
| 422 | Ground |
| 424 | Enable input |
| 426_0, 426_1, 426_10 | Inputs from the transition detector |
| 428 | Drain connection from the input transistors to the discharge transistor |
| 430 | Source connections from the input transistors to the pre-charge transistor and the hold transistor |

| | |
|---|---|
| 432 | Supply rail |
| 434 | Output |
| MP1 | Pre-charge transistor |
| MP2 | Hold transistor |
| MN1, MN2, MN11 | Input transistors |
| MN12 | Discharge transistor |
| 450 | Programmable delay stage |
| 452 | Delay stage input |
| 454 | Delay stage output |
| AI1, AI2, AI16 | Input signal AND gates |
| ND1, ND2, ND16 | Select NAND gates |
| AO1, AO2, AO16 | Output signal AND gates |
| S0, S1, S15 | Control input signals |
| 500 | Example waveforms of timing corrections |
| 502 | Error waveform |
| 504 | Data |
| 506 | Uncorrected clock |
| 508 | Gated clock |
| 510 | Stretched clock |
| 550 | Example signal waveforms of error generation |
| 552 | Reference clock |
| 554 | Output system clock |
| 556 | Evaluation signal |
| 558 | Error detection input/transition detector output |
| 560 | Error detection output |
| 562 | Latched error detection output |
| 570 | Example behaviour of the proposed invention |
| 572 | Variation of frequency versus time (number of clock cycles) |
| 574 | Error rate versus clock frequency |
| 576 | y-axis 2 (error rate) |
| 578 | y-axis 1 (frequency MHz) |
| 580 | x-axis time (number of clock cycles) |
| 600 | Clock gating circuit |
| 602 | Clock input |
| 604 | Error detection output |
| 606 | Flip-flop |
| 608 | Error output |
| 610 | AND gate |
| 612 | System clock output |
| 650 | Timing correction circuit |
| 654a, 656a, 661a | First series of clock path inverters |
| 654b, 656b, 661b | Second series clock path inverters |
| 654, 658, 660 | Clock path multiplexers |
| 656 | Error output |
| 662 | Reference clock output |
| 664 | Clock unit |
| 666 | AND gate |
| 668 | Programmable delay |
| 670 | Delayed clock output |
| 672 | Enable signal output |
| 674 | Timing corrector |
| 676 | Programmable delay |
| 680 | Timing corrector multiplexer |
| 682 | System clock |
| 700 | Integrated circuit |
| 702_1, 702_2, 702_3, 702_4 | Register including one or more flip-flops |
| 704_1, 704_2, 704_3 | Datapath logic |
| 706 | Inputs |
| 708 | Datapath nodes |
| 710 | Transition detectors |
| 712 | Transition detector outputs |
| 714 | Error detector |
| 716 | Error detector output |
| 718 | Enable signal generation out |
| 720 | System clock output |
| 722 | Multi-phase Enable signal generator |
| 724 | Enable signal generator control |
| 726_0, 726_1, 726_2, 726_3 | Multi clock phases |
| 727 | Multiphase clock generator |
| 728 | Master clock generator |
| 729 | Error signal selection |
| 730_0, 730_1, 730_2, 730_3 | Enable signal generator |
| CLK0, CLK1, CLK2, CLK3 | Input clocks |
| 732_0, 732_1, 732_2, 732_3 | Enable signal generator |
| 734_0, 734_1, 734_2, 734_3 | Enable signal generator |

| | |
|---|---|
| 736 | Enable signal generator multiplexer |
| 738 | Clock phase select multiplexer |
| 750 | Multiphase clock waveforms |
| 800 | Method of integrated circuit design |
| 802 | Place and route |
| 804 | Critical cells selection (expansion of design flow) |
| 806 | ECO place transition detector |
| 808 | Cluster transition detectors (expansion of design flow) |
| 810 | Place dynamic OR error detectors |
| 812 | ECO route |
| 820 | The 20 most critical PDFs |
| 822 | Timing (nanosecond) |
| 824 | PDF value |
| 830 | Endpoints and number of cells versus timing at clock and slow PVT corner |
| 832 | Number of endpoints |
| 834 | Timing (nanosecond) |
| 836 | Number of cells |
| 840 | Example of timing detection location at floorplan level |
| 850 | Example of dynamic-or location as well as timing detection connectivity. |

The invention claimed is:

1. A timing error detection and correction circuit comprising:
    a data-path including at least one logic gate and coupled between an output of a first flop-flop and an input of a second flip-flop,
    a clock unit configured to receive a reference clock and to provide a delayed reference clock;
    a transition detector coupled to a node on the data-path and configured to detect a data value transition on the node;
    an error detection circuit coupled to the transition detector and the clock unit and configured to detect an error in response to the data value transition being detected during a time period between a transition of the reference clock and a corresponding transition of the delayed reference clock;
    a timing correction circuit coupled to the error detection circuit and configured
        to output a system clock derived from the delayed reference clock and
        to provide the system clock to the first flip-flop and the second flip-flop and
    wherein the timing correction circuit is further configured to adapt the system clock in response to an error being detected.

2. The circuit of claim 1 further comprising,
    a further transition detector coupled to a further node on the data-path and configured to detect a signal transition on the further node;
    wherein the error detection circuit is coupled to the further transition detector and is further configured to detect an error in response to a signal transition being detected by at least one of the transition detector and the further transition detector during a time period between a transition of the reference clock and a corresponding transition of the delayed reference clock.

3. The circuit of claim 2
    wherein the data-path is arranged between a first set of flip-flops comprising the first flip-flop node and a second set of flip-flops comprising the second flip-flop and
    wherein the node and the further node have a path delay to at least one of the second set of flip-flops of less than a predetermined percentage of a period of the reference clock.

4. The circuit of claim 2
    further comprising a logic circuit element having a first input coupled to the reference clock input and a second input coupled to the delayed reference clock output
    wherein the error detection circuit comprises
        a dynamic logic circuit having an input coupled to an output of the transition detector,
        a further input coupled to an output of the further transition detector and
        an enable input coupled to an output of the logic circuit element and
    wherein the dynamic logic circuit implements a logical OR of the transition detector output and the further transition detector output.

5. The circuit of claim 1
    wherein the clock unit comprises a delay unit having an input coupled to a reference clock input and an output coupled to a delayed reference clock output; and
    a logic circuit element having a first input coupled to the reference clock input and a second input coupled to the delayed reference clock output and configured to generate a signal for enabling the error detection circuit when the reference clock and the delayed reference clock are different.

6. The circuit of claim 5
    wherein the logic circuit element is configured to generate an enable signal when the reference clock is logic high and the delayed reference clock is logic low.

7. The circuit of claim 6
    wherein the logic circuit element implements a logical AND of an inverse of the delayed reference clock and the reference clock.

8. The circuit of claim 5
    wherein the error detection circuit comprises a dynamic logic circuit having an input coupled to an output of the transition detector and an enable input coupled to an output of the logic circuit element.

9. The circuit of claim 1
wherein the transition detector includes a transition detector input coupled to an input of a delay unit and a first input of an EXOR gate;
an output of the delay unit coupled to a second input of the EXOR gate; and
an output of the EXOR gate coupled to an output of the transition detector.

10. The circuit of claim 1
wherein the timing correction circuit further includes
a clock gate circuit having an error detect input coupled to an output of the error detection circuit,
a clock input coupled to an output of the clock unit and
a system clock output
wherein the clock gate circuit is configured to couple the system clock output to the clock input if no error is detected and to decouple the system clock output from the clock input if an error is detected.

11. The circuit of claim 1
wherein the timing correction circuit further comprises
a clock stretching circuit having an error detect input coupled to an output of the error detection circuit,
a clock input coupled to an output of the clock unit and
a system clock output
wherein the clock gate circuit is configured to couple the system clock output to the clock input if no error is detected and to couple the system clock output to a time-shifted clock input if an error is detected.

12. The circuit of claim 11 wherein the clock stretching circuit comprises:
a clock phase generator having an input coupled to the clock input and a plurality of outputs and configured to generate multiple phase outputs of a clock received on the clock input;
a clock switch circuit having a plurality of inputs, each input coupled to a respective output of the clock phase generator; and
a clock switch controller having an input coupled to the output of the error detection circuit and a controller output coupled to a control input of the clock switch circuit;
and wherein the clock switch controller is configured to control the clock switch circuit to couple one of the outputs to the system clock output dependent on a signal received on the error detection input.

13. The circuit of claim 11 wherein the clock stretching circuit comprises:
a multiplexer having a first input coupled to the clock input, a second input, a control input coupled to the error detect input, and an output coupled to the system clock output;
a further programmable delay having an input coupled to the clock input and an output coupled to a second input of the multiplexer;
wherein the multiplexer is configured to couple the second input to the output in response to an error being detected and to couple the first input to the output in response to no error being detected.

14. The circuit of any of claim 1
wherein the timing correction circuit comprises at least one of a power supply adjustment circuit and a body bias circuit adjustment,
wherein the timing correction circuit is configured to adjust at least one of the power supply and the body bias in response to an error being detected.

15. A circuit comprising
a data-path comprising at least one logic gate,
the data-path being arranged between
a first set of flop-flops comprising the first flip-flop and
a second set of flop-flops comprising the second flip-flop and the timing error detection and correction circuit of claim 1.

16. A method of designing an integrated circuit comprising:
a clock unit configured to receive a reference clock and to provide a delayed reference clock;
a data-path including at least one logic gate, wherein the data-path is coupled between an output of a first flop-flop and an input of a second flip-flop;
a plurality of transition detectors coupled to a respective node on the data-path and configured to detect a data value transition on the respective node;
an error detection circuit coupled to the plurality of transition detectors and the clock unit and configured to detect an error in response to the data value transition being detected during a time period between a transition of the reference clock and a corresponding transition of the delayed reference clock;
a timing correction circuit coupled to the error detection circuit and configured
to output a system clock derived from the delayed reference clock and
to provide the system clock to the first flip-flop and the second flip-flop and
wherein the timing correction circuit is further configured to adapt the system clock in response to an error being detected,
wherein the method includes:
placement and routing of logic cells in the integrated circuit;
identifying logic cells on critical timing paths corresponding to data-path nodes;
placing the plurality of the transition detectors;
identifying clusters of transition detectors;
placing circuit elements of the error detection circuit dependent on the clusters;
connecting the transition detectors to the data-path nodes and the error detection circuit.

17. A circuit comprising
a data-path being arranged between an output of a first set of flop-flops and an input of a second set of flip-flops, and
a timing error detection and correction circuit comprising:
a clock unit configured to receive a reference clock and to provide a delayed reference clock;
a plurality of transition detectors,
wherein each of the plurality of transition detectors are coupled to a a set of nodes on the data-path and configured to detect a data value transition;
an error detection circuit coupled to the transition detector and the clock unit and configured to detect an error in response to a data value transition being detected by one or more of the plurality of transition detectors during a time period between a transition of the reference clock and a corresponding transition of the delayed reference clock;
a timing correction circuit coupled to the error detection circuit and configured
to output a system clock derived from the delayed reference clock and
to provide the system clock to the first set of flip-flops and the second set of flip-flops and wherein the timing correction circuit is further configured to adapt the system clock in response to an error being detected.

18. The circuit of claim 17 wherein the set of nodes each have a path delay to the second set of flip-flops of less than a predetermined percentage of the reference clock period.

19. The circuit of claim 17 wherein the time period between a transition of the reference clock and a corresponding transition of the delayed reference clock is the time period between a rising edge of the reference clock and the next rising edge of the delayed reference clock.

20. The circuit of claim 17 wherein the time period between a transition of the reference clock and a corresponding transition of the delayed reference clock is the time period between a falling edge of the reference clock and the next falling edge of the delayed reference clock.

\* \* \* \* \*